US010239696B1

(12) United States Patent
Brouk

(10) Patent No.: US 10,239,696 B1
(45) Date of Patent: Mar. 26, 2019

(54) CONVEYOR CARTRIDGE

(71) Applicant: Intelligrated Headquarters, LLC, Mason, OH (US)

(72) Inventor: Justin Brouk, Cincinnati, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

(21) Appl. No.: 15/946,772

(22) Filed: Apr. 6, 2018

(51) Int. Cl.
*B65G 15/60* (2006.01)
*B65G 21/06* (2006.01)
*B65G 21/22* (2006.01)
*B65G 39/12* (2006.01)
*B65G 17/34* (2006.01)

(52) U.S. Cl.
CPC .............. *B65G 15/60* (2013.01); *B65G 21/06* (2013.01); *B65G 21/22* (2013.01); *B65G 39/12* (2013.01); *B65G 17/345* (2013.01); *B65G 2207/30* (2013.01)

(58) Field of Classification Search
CPC ........ B65G 15/24; B65G 15/60; B65G 15/62; B65G 17/345; B65G 21/00; B65G 21/06; B65G 21/22; B65G 23/04; B65G 23/08; B65G 39/12; B65G 41/00; B65G 2207/30
USPC .... 198/370.06, 841, 842, 843, 860.1, 860.2, 198/860.3
See application file for complete search history.

(56) References Cited

U.S. PATENT DOCUMENTS

| | | | | | |
|---|---|---|---|---|---|
| 3,082,858 | A | * | 3/1963 | King ...................... | B65G 39/16 198/300 |
| 3,944,054 | A | * | 3/1976 | Ensinger ................ | B65G 21/06 198/860.3 |
| 4,146,126 | A | * | 3/1979 | Mattos ................... | B65G 15/00 198/583 |

(Continued)

FOREIGN PATENT DOCUMENTS

CN          104370062 A          2/2015

OTHER PUBLICATIONS

A&D Inspection Simplified—Handy Hints Series—Change a conveyor Belt on A&D EZICheck Checkweigher—YouTube [online] [retrieved Apr. 2, 2018]. Retrieved from the Internet: https://www.youtube.com/watch?v-bgpHhWAEAAk>. (dated Feb. 25, 2016) 2 pages.

(Continued)

*Primary Examiner* — Gene O Crawford
*Assistant Examiner* — Keith R Campbell
(74) *Attorney, Agent, or Firm* — Alston & Bird LLP

(57) ABSTRACT

A conveyor cartridge that is removably coupled to a conveyor frame is provided. The conveyor cartridge comprises a cartridge frame, conveyor rollers, and a belt. The cartridge frame comprises a first side plate and an opposite second side plate, extended portions, and arcuate sloped surfaces. The first and second side plates delimit a direction of the conveyor cartridge transverse to a transport direction. Each extended portion is formed on a top surface of one of the first or second side plates and extends outward beyond the (Continued)

corresponding one of the first side plate and the second side plate in the direction transverse to the transport direction. The arcuate sloped surfaces are integrally formed on opposite end portions of the extended portions. The arcuate sloped surfaces are downwardly bowed on the opposite end portions to define a curved head portion and a curved tail portion for the extended portions.

20 Claims, 6 Drawing Sheets

(56) References Cited

U.S. PATENT DOCUMENTS

| | | | | |
|---|---|---|---|---|
| 4,712,965 | A * | 12/1987 | Canziani | B61B 13/04 |
| | | | | 414/339 |
| 5,174,435 | A * | 12/1992 | Dorner | B65G 23/44 |
| | | | | 198/806 |
| 5,423,418 | A | 6/1995 | Furrow | |
| 5,580,044 | A * | 12/1996 | Wafler | B65H 29/12 |
| | | | | 198/840 |
| 5,580,444 | A | 12/1996 | Wafler | |
| 5,692,597 | A * | 12/1997 | Ferguson | B65G 15/00 |
| | | | | 198/841 |
| 6,523,664 | B2 * | 2/2003 | Shaw | B65G 1/023 |
| | | | | 193/35 R |
| 6,619,473 | B2 * | 9/2003 | Romeo | B65G 21/02 |
| | | | | 198/836.1 |
| 7,080,725 | B2 * | 7/2006 | Hishinuma | B65G 17/345 |
| | | | | 198/370.06 |
| 7,152,730 | B2 * | 12/2006 | Gerke | B65G 21/00 |
| | | | | 198/860.3 |
| 7,267,223 | B2 * | 9/2007 | Spoors | B65G 21/02 |
| | | | | 198/816 |
| 8,695,788 | B2 | 4/2014 | Lindemann | |
| 9,233,803 | B2 * | 1/2016 | Pilarz | B65G 47/53 |
| 2014/0034457 | A1 | 2/2014 | Kliefoth | |
| 2015/0166263 | A1 * | 6/2015 | Collot | B65G 21/2072 |
| | | | | 198/860.1 |

OTHER PUBLICATIONS

Conveyor Belt Replacement Procedure (Head Drive).wmv-YouTube [online] [retrieved Apr. 2, 2018]. Retrieved from the Internet: https://www.youtube.com/watch?v-x4s8QXKUkuw>. (dated Jan. 29, 2012) 2 pages.

Flat Magnetic Slide conveyors | Goudsmit Magnetics [online] [retrieved Apr. 2, 2018]. Retrieved from the Internet: http://www.goudsmitmagnets.com/industrial-magnetic-systems/magnetic-handling/magneti . . . >(undated) 6 pages.

* cited by examiner

CONVEYOR CARTRIDGE

TECHNICAL FIELD

The present disclosure relates in general to material handling systems, and, more specifically, relates to modular conveyor systems with removable conveyor cartridges employed in the conveyor system.

BACKGROUND

Conventional conveyor systems and assemblies may include a conveyor bed and multiple conveyor carriers in the form of conveyor rollers or belts supported on a conveyor frame of the conveyor bed. The multiple conveyor carriers are often used for supporting and transporting objects in industrial and manufacturing contexts. An example conveyor system or assembly may include a sorter conveyor system, a merge conveyor system, an accumulation conveyor system, an induction conveyor system, or the like. These conveyor assemblies are often divided into zones. Each zone may include a set of motorized and non-motorized conveyor rollers with each conveyor roller having an axle coupled to the conveyor frame. The set of motorized and non-motorized conveyor rollers are often overrun by conveyor belts. These conveyor belts are driven by the set of motorized conveyor rollers to accumulate articles on each zone, to move articles in the direction of travel, or to discharge articles into neighboring zones or discharge stations. Applicant has identified a number of deficiencies and problems associated with maintenance of each zone of the conveyor assemblies. Through applied effort, ingenuity, and innovation, many of these identified problems have been solved by developing solutions that are included in embodiments of the present disclosure, many examples of which are described in detail herein.

BRIEF SUMMARY OF SOME EXAMPLE EMBODIMENTS

The following presents a simplified summary in order to provide a basic understanding of some aspects of the disclosed conveyor system. This summary is not an extensive overview and is intended to neither identify key or critical elements nor delineate the scope of such elements. Its purpose is to present some concepts of the described features in a simplified form as a prelude to the more detailed description that is presented later.

Various aspects described herein relate to a conveyor system including a conveyor frame. The conveyor frame includes a first side rail and a second side rail. The second rail is disposed opposite to the first rail. A conveyor cartridge is removably coupled to the first side rail and a second side rail of the conveyor frame. The conveyor cartridge includes a cartridge frame. The cartridge frame includes a first side plate and a second side plate that delimit a direction of the conveyor cartridge transverse to transport direction of the conveyor system. The cartridge frame further includes an extended portion is integrally formed on a top surface of each of the first side plate and the second side plate and extends outward beyond the corresponding one of the first side plate and the second side plate in the direction transverse to the transport direction. The cartridge frame further includes an arcuate sloped surface is integrally formed on each of opposite end portions of each of the extended portions, wherein the arcuate sloped surfaces are downwardly bowed on the opposite end portions to define a curved head portion and a curved tail portion for each of the extended portions. The conveyor cartridge further includes conveyor rollers rotatably mounted to axles and extending a conveyor roller width between the first side plate and the second side plate. An axle of at least one of the conveyor rollers protrudes out through the first side plate and the second side plate. The conveyor cartridge further includes a belt that is slidably engaged to the cartridge frame such that the belt fully covers the conveyor rollers and extends beyond the conveyor rollers to at least partially cover each of the extended portions.

Various aspects described herein relate to the conveyor system with the extended portions extending uniformly throughout the length of the first side plate and the second side plate.

Various aspects described herein relate to the conveyor system with the curved head portion and the curved tail portion extending beyond the length of the first side plate and the second side plate.

Various aspects described herein relate to the conveyor system with the curved head portion and the curved tail portion being proximal to the at least one of the conveyor rollers with axles protruding out through the first side plate and the second side plate.

Various aspects described herein relate to the conveyor system with the arcuate sloped surfaces having a curved dimension substantially equal to the curved dimension of one half of the outer radial circumference of the at least one of the conveyor rollers, and the arcuate sloped surface encloses a substantial portion of the protruding axles. For example, the radius of curvature of the arcuate sloped surface may be approximately equal to the outer radius of the at least one of the conveyor rollers.

Various aspects described herein relate to the conveyor system with a protruding portion of the axle of the at least one of the conveyor rollers mechanically coupling to axle retaining members on the first side rail and the second side rail of the conveyor frame.

Various aspects described herein relate to the conveyor system with the extended portion abutting against the first side rail and the second side rail covering a gap existing between the cartridge frame and the conveyor frame.

Various aspects described herein relate to the conveyor system including the first side plate and the second side plate comprising one or more apertures to receive axles of the conveyor rollers.

Various aspects described herein relate to the conveyor system including the at least one of the conveyor rollers comprising a first protruding portion and a second protruding portion.

Various aspects described herein relate to the conveyor system including the first protruding portion of the at least one of the conveyor rollers projecting beyond the first side plate in a direction parallel to the transport direction, and the second protruding portion of the at least one of the conveyor rollers projecting out in a direction transverse to the transport direction away and/or upward from the extended portion.

Various aspects described herein relate to the conveyor system including a first offset distance provided between the first protruding portion and a leading edge of the arcuate sloped surface creating a first clearance between the arcuate sloped surface and the belt.

Various aspects described herein relate to the conveyor system including a second offset distance that is provided between the second protruding portion and a top surface of the extended portion creating a second clearance between the extended portion and the belt.

Various aspects described herein relate to the conveyor system including the end conveyor rollers driven by a drive conveyor roller and the drive conveyor roller being a motor driven conveyor roller (MDR).

Various aspects described herein relate to the conveyor system including a belt extending beyond the conveyor roller width such that the belt at least partially covers each of the extended portions.

Various aspects described herein relate to a conveyor cartridge removably coupled with a first side rail and a second side rail of a conveyor frame. The conveyor cartridge includes a cartridge frame having a first side plate and an opposite second side plate that delimit a direction of the conveyor cartridge transverse to transport direction. The conveyor cartridge further includes conveyor rollers rotatably mounted to axles and extending a conveyor roller width between the first side plate and the second side plate. An axle of at least one of the conveyor rollers protrude out through the first side plate and the second side plate. The conveyor cartridge further includes an extended portion integrally formed on a top surface of each of the first side plate and the second side plate and extending beyond the first side plate and the second side plate in the direction transverse to the transport direction. The conveyor cartridge further includes an arcuate sloped surface integrally formed on opposite end portions of each of the extended portions, wherein the arcuate sloped surfaces are downwardly bowed on the opposite end portions to define a curved head portion and a curved tail portion for the corresponding extended portion. The conveyor cartridge further includes a belt slidably engaged with the cartridge frame fully covers the conveyor rollers and extends beyond the conveyor rollers to at least partially cover each of the extended portions.

Various aspects described herein relate to the conveyor cartridge including one or more connecting rods to mechanically couple the first side plate and the second side plate together.

Various aspects described herein relate to the conveyor cartridge including the at least one of the conveyor rollers with a protruding axle being an idler conveyor roller or a drive conveyor roller.

Various aspects described herein relate to the conveyor cartridge having a first side plate and an opposite second side plate that delimits a direction of the conveyor cartridge transverse to transport direction. An extended portion integrally formed on a top surface of each of the first side plate and the second side plate and that extends beyond the corresponding one of the first side plate and the second side plate in the direction transverse to the transport direction. The conveyor cartridge further comprises a arcuate sloped surfaces integrally formed on opposing end portions of each of the extended portion, wherein the arcuate sloped surface is downwardly bowed on the opposing end portions to define a curved head portion and a curved tail portion for the corresponding extended portion.

Various aspects described herein relate to the conveyor cartridge including the arcuate sloped surface having a curved dimension substantially equal to one half of the inner radial circumference of the at least one of the conveyor rollers of the at least one of the conveyor rollers. For example, in an example embodiment, the radius of curvature of the arcuate sloped surface may be approximately equal to the inner radius of the at least one of the conveyor rollers.

Various aspects described herein relate to the conveyor cartridge including the arcuate sloped surface along with the at least one of the conveyor rollers imparting a gripping and a stretching force to the belt to maintain the belt at a desired tension.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
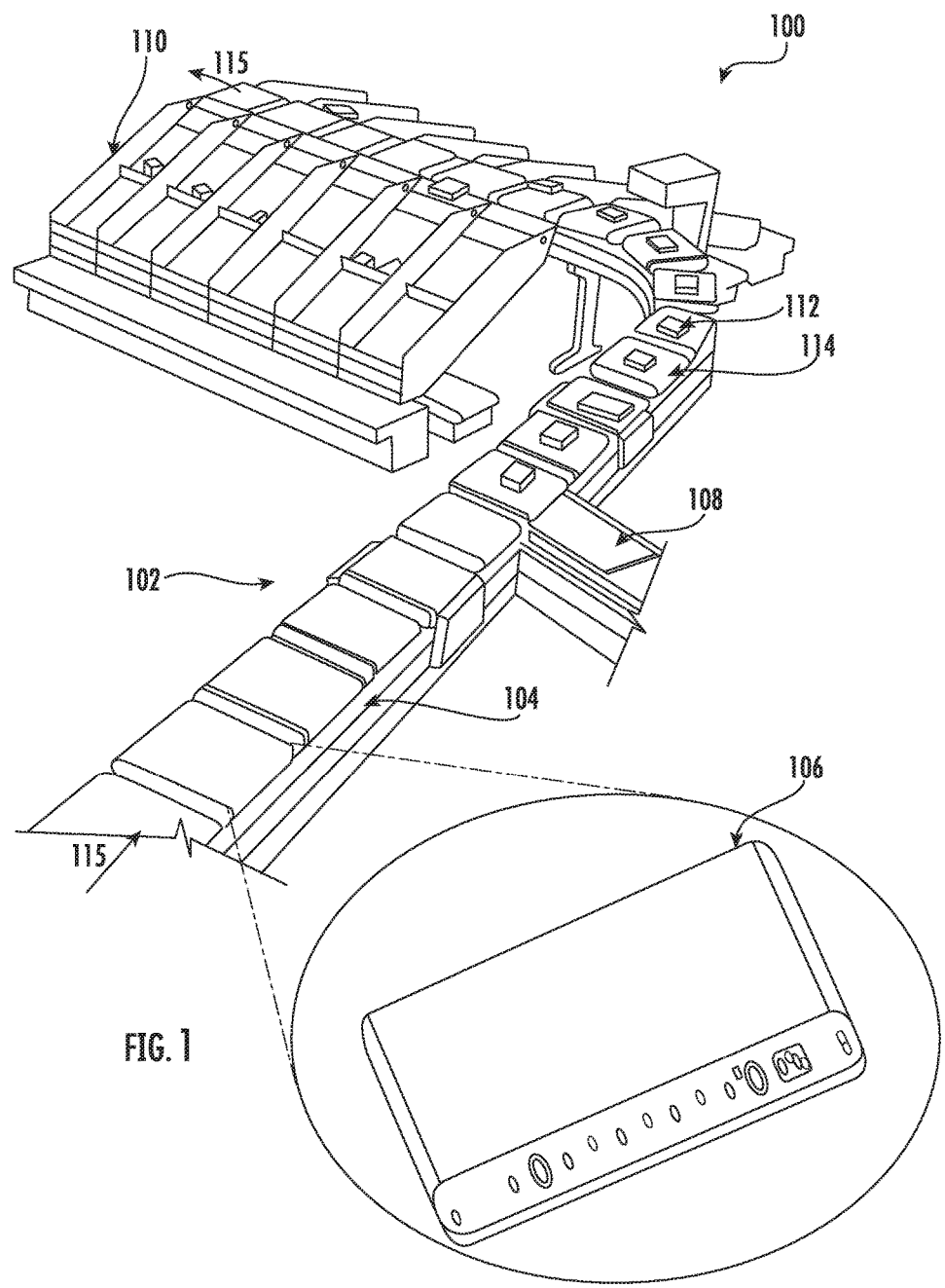
FIG. 1 illustrates a perspective view of a material handling system 100, in accordance with one or more embodiments of the present disclosure.

Some embodiments of the present disclosure will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The terms "substantially" and "approximately" are used herein to refer to within engineering and/or manufacturing standards.

As used herein, the terms "conveyor section," "conveyor bed," "conveyor assembly/system," and similar terms may be used interchangeably to refer to a conveyor capable of conveying articles within a material handling system in accordance with embodiments of the present disclosure. Thus, use of any such terms should not be taken to limit the spirit and scope of embodiments of the present disclosure.

As used herein, the terms "belt," "slidable/sliding belt," "elastic belt," "stretchable belt" and similar terms may be used interchangeably to refer to a belt made of high modulus material which may stretch due to its elastic properties when slid over conveyor cartridge frame in accordance with embodiments of the present disclosure. Thus, use of any such terms should not be taken to limit the spirit and scope of embodiments of the present disclosure.

The word "exemplary," when used herein, is intended to mean "serving as an example, instance, or illustration." Any implementation described herein as "exemplary" is not necessarily preferred or advantageous over other implementations.

The term "downstream direction" is used herein to refer a transport direction of the articles conveyed on the conveyor. In this regard "transport direction" is used herein to refer to a direction of travel of the articles on the conveyor from a source to a destination. The term "upstream direction" is used herein to refer to a direction opposite of the transport direction.

The term "upstream end" is used herein to refer an end portion of a cartridge frame, a side plate, and an extended portion of the side plate located in proximity to the upstream direction. The term "downstream end" is used herein to refer an end portion of the cartridge frame, the side plate, and the extended portion of the side plate located in proximity to the downstream direction.

The term "supporting ends" is used herein to refer a part of axles of conveyor rollers and connecting rods which are seated on the cartridge frame through a mechanical coupling.

The term "conveyor roller width" or "full width of the conveyor rollers" is used herein to refer to a width of the conveyor rollers including the axles protruding out from each conveyor roller. The "conveyor roller width" or "full width" may be equal to a distance between the opposite side plates of the cartridge frame on which the conveyor rollers are mounted.

The term "protruding portion" of the axle is used herein to refer to visible portions of the axles protruding out from the conveyor rollers.

The term "protruding portion" of the end conveyor roller is used herein to refer to a part of the end conveyor roller projecting out, for example from the axle of the end conveyor roller, in either an upstream direction or a downstream direction at a longitudinal distance away from the opposite side plates of the cartridge frame. The term "protruding portion" of the end conveyor roller is also used herein to refer to a part of the end conveyor roller projecting out, for example from the axle of the end conveyor roller, in a direction transverse to the upstream and downstream direction away from a top surface of the side plates.

The term "opposite end portions" of the conveyor rollers, the side plates and the extended portion is used herein to refer to parts located at opposite extreme ends along a longitudinal length of the side plate and the extended portion, and along a transverse width of the conveyor rollers; wherein each part is a mirror image of one another.

The term "central portion" of the conveyor rollers, the side plates and the extended portion is used herein to refer to parts located in between the opposite extreme ends.

The term "side portion" of the belt is used herein to refer to a part of the belt facing the conveyor rails of the conveyor frame and running parallel to the conveyor rails. The term "front portion" of the belt is used herein to refer to a part of the belt located at the downstream end running perpendicular and/or transverse to the conveyor rails. The term "rear portion of the belt is used herein to refer to a part of the belt located at the upstream end running perpendicular and/or transverse to the conveyor rails.

The term "edges" of the belt is used herein to refer to a part of the belt having initial contact with the cartridge frame when slid over the cartridge frame. The edges generally belong to the side portions of the belt.

The term "opposite side portions" of the belt is used herein to refer to mirror imaged side portion of the belt running perpendicular to the front portion and the rear portion of the belt.

The term "first gap" on the conveyor is used herein to refer to an intentionally inserted spaced apart gap that exists between subsequent conveyor rollers that facilitates a free rotation for each conveyor roller around their rotation axis.

The term "second gap" on the conveyor is used herein to refer to an unintentionally inserted uniform gap that exists in between a series of conveyor rollers of a particular zone and the conveyor rails of the conveyor frame.

The term "maintenance activity" is used herein to refer to a replacement of the conveyor cartridge with a substitute conveyor cartridge or replacement of one or more conveyor rollers of the conveyor cartridge or replacement of the belt of the conveyor cartridge.

The term "arcuate sloped surface" is used herein to refer both curved head portion and curved tail portion of the extended portion on both the first and second side plates.

In conventional conveyor assembly, a conveyor frame may be provided with conveyor rollers and belts. The belts may be reeved over these conveyor rollers. The conveyor rollers may comprise motorized and/or non-motorized conveyor rollers. The belts may include multiple strip belts reeved around the conveyor rollers with a desired tension. For example, strip belts may be belts of shorter width arranged in a sequenced manner either with uniform gaping or with no gapping over a set of conveyor rollers. For example, the desired tension being a minimum required tension between the strip belts and the conveyor rollers to prevent folding or wrinkling of the strip belt. When these conveyor rollers carrying the strip belts are fixed to the conveyor frame, axles of these conveyor rollers are mechanically seated on slots provided on the conveyor frame. In this regard, when a conveyor roller or a strip belt from among other conveyor rollers or multiple strip belts of a particular zone on the conveyor frame is subject to a failure, the conveyor roller or the strip belt of that particular zone needs to be replaced or repaired. For example, when the conveyor rollers or the strip belts are handling heavy loads, excessive stress and premature wear may be caused in a conveyor roller or a strip belt from among the other conveyor rollers or strip belts resulting in replacement or repair of the conveyor roller or the strip belt. In such scenarios when the strip belt needs to replaced, each of the strip belt reeved around the conveyor rollers of that particular zone needs to be removed by pulling the strip belt out of contact with the conveyor rollers. In this regard, each of the strip belts may be tightly reeved around their associated conveyor rollers to maintain the desired tension, hence, removal of each strip belt from the associated conveyor rollers may result in operator pinching his hands between the conveyor rollers and the strip belts. Therefore, the operator needs to release all of the conveyor rollers of the particular zone from their associate slots in order to release the desired tension and then subsequently remove each conveyor roller from the conveyor frame in order to remove the strip belt out of contact with the conveyor rollers. In such a scenario, there exists a possibility of the strip belts being reeved around the conveyor rollers of a neighboring zone, therefore, the operator needs to release all the conveyor rollers from their associate slots in the neighboring zone in order to release the desired tension and remove each strip belt out of contact with the conveyor rollers. Accordingly, when the maintenance activity is performed on the particular zone, the entire conveyor assembly may be shut down as the conveyor rollers of the particular zone and the neighboring zone need to be released from their associated slots on the conveyor frame. After performing the maintenance activity, the operator assembles all of the conveyor rollers of the particular zone and the neighboring zone into their corresponding slots and then reeves each strip belt over the conveyor rollers along with the strip belt replaced by the operator. The entire conveyor assembly remains shut down during assembly or disassembly of the conveyor rollers and the strip belts. Further, during the maintenance activity, the operator may be cautious to first release the desired tension between the strip belts and the conveyor rollers by releasing all the conveyor rollers from their corresponding slots and then removing each conveyor roller form their associated slots to pull the strip belts out of contact with the conveyor rollers. In this regard, maintenance time required to perform the maintenance activity is substantially increased as the operator needs to remove all of the conveyor roller to remove the strip belt subjected to a failure. This increase in maintenance time encountered for the maintenance activity in turn increases the downtime of the conveyor assembly as it is shut down during the maintenance activity. In this regard, increase in the downtime greatly affects productivity of material handling systems.

In other scenarios, the strip belts may not completely cover a full width of the conveyor rollers. For example, the full width of the conveyor rollers includes width of the conveyor rollers including the axles protruding out from each conveyor roller. In such scenarios, a part of the conveyor rollers along with the axle of these conveyor rollers may be exposed to the articles travelling on the conveyor rollers. Due to this exposure, a first gap exists in between subsequent conveyor rollers of the particular zone as a part of each conveyor roller on the particular zone is not fully covered by the strip belt. For example, the first gap may be an intentionally inserted spaced apart gap that exists between subsequent conveyor rollers that facilitates a free rotation for each conveyor roller around their rotation axis. Further, when these conveyor rollers are installed on the conveyor frame of the conveyor bed, there exists a second gap between these conveyor rollers and the conveyor frame. This second gap exposes the axles protruding out of the conveyor rollers to connect with the conveyor frame. For example, the second gap may be an unintentionally inserted uniform gap that exists in between a series of conveyor rollers of a particular zone and conveyor rails of the conveyor frame.

Therefore, both the first gap and the second gap of the particular zone presents a serious risk when the conveyor assembly is handling flexible articles and/or articles of smaller dimensions, such as polybags or flat mails, as these articles may become stuck in between these gaps, which ultimately limits the use of such a conveyor assembly only to larger articles. Furthermore, when the conveyor assembly is handling fragile articles, there exists a possibility of breakage of the fragile articles when packaging becomes stuck in these gaps.

Through applied effort, ingenuity, and innovation, many of the above identified problems have been solved by developing solutions that are included in embodiments of the present disclosure, many examples of which are described in detail herein. Various embodiments of the present disclosure relates to a conveyor cartridge removably coupled with a first side rail and a second side rail of a conveyor frame. The conveyor cartridge includes a cartridge frame, conveyor rollers, and a belt. The cartridge frame includes a first side plate and an opposite second side plate that delimit a direction of the conveyor cartridge transverse to a transport direction of the conveyor cartridge. Further, the cartridge frame includes an extended portion integrally formed on a top surface of both the first side plate and the second side plate extending beyond the first side plate and the second side plate in the direction transverse to the transport direction. An arcuate sloped surface is integrally formed on opposite end portions of the extended portion. The arcuate sloped surface is downwardly bowed on the opposite end portions to define a curved head portion and a curved tail portion for the extended portion. Conveyor rollers on this conveyor cartridge are installed between the first side plate and the second side plate and the belt is slidably engaged to the cartridge frame fully covering the conveyor rollers and extending beyond the conveyor rollers. For example, the belt may cover at least a portion and/or all of the extended portion. The conveyor cartridge is installed on the conveyor frame and the axles of the conveyor rollers are seated on axle retaining members of the conveyor frame.

When an operator needs to perform a maintenance activity on this conveyor cartridge installed in a particular zone, the cartridge frame as a whole can be lifted along with the conveyor rollers and the belt as a single unit from the axle retaining members without need of releasing and removing each of the conveyor rollers from the conveyor frame. In fact, the slots provided on the conveyor frame to attach the conveyor rollers may not be utilized as the conveyor cartridge frame in itself is removable from the axle retaining members. Further, the arcuate sloped surface of the extended portions extending or protruding out from both side plates of the conveyor cartridge frame facilitate in easy removal and reinsertion of the belt from the conveyor rollers. For example, when reinserting the belt, the operator may hold the edges of the belt and insert it over the arcuate sloped surface and the belt may be pushed to smoothly slide over the extended portion and stretched to cover a full width of the conveyor rollers of the particular zone under maintenance. For example, when removing the belt, the operator may hold the edges of the belt stretched over the arcuate sloped surface and slide the belt out away from the extended portion in order to smoothly move the belt out of contact with the conveyor rollers. In this regard, the extended portion and the arcuate sloped surface facilitates smooth and easy removal and reinsertion of the belt from the conveyor rollers. Thereby, the operator is refrained from pinching of fingers in-between the conveyor rollers and the belt during the maintenance activity. Further, since the belt is slid over the arcuate sloped surface and then stretched over the full width of the conveyor rollers, a desired tension between the conveyor rollers and the belt is maintained. Furthermore, since the belt stretches beyond the full width of the conveyor rollers to substantially cover the extended portion and the arcuate sloped surface, the edges of the belt over the arcuate sloped surface may be instrumental in providing a support for pulling the belt out of contact with the conveyor rollers while the belt is still under the desired tension.

Further, when the conveyor cartridge is installed on the conveyor frame, the extended portion fills or covers the gaps (i.e., the first gap and the second gap as previously discussed) existing between the conveyor rollers and between the cartridge frame and the conveyor frame, thereby, facilitating the conveyor assembly to handle wide varieties of articles including small articles or fragile articles or flat mails or polybags.

Since, the conveyor cartridge frame is removable from the conveyor frame of the conveyor bed and the belt may be replaced at a faster pace with minimal operator effort during the maintenance activity, the maintenance time of the conveyor cartridge may be reduced. Since the maintenance time of the conveyor cartridge is reduced, the downtime of the conveyor assembly is reduced as it is shut down only for a shorter span of time during the maintenance activity. Thereby, the productivity of the material handling systems is greatly increased due to the reduced downtime.

In the following detailed description of exemplary embodiments of the disclosure, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various elements are described which may be present for some embodiments but not other embodiments.

It is understood that the use of specific component, device and/or parameter names and/or corresponding acronyms thereof, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which a different element, feature, protocol, or concept name is utilized. Thus, each term utilized herein is to be given its broadest interpretation given the context in which that terms is utilized.

FIG. 1 illustrates a perspective view of a material handling system 100, in accordance with one or more embodiments of the present disclosure. The material handling system 100 may include a conveyor 102. The conveyor 102 may include a conveyor bed 104 and one or more conveyor cartridges, one of which is shown at 106. The material handling system 100 includes an induction station 108 positioned adjacent to the conveyor 102 at one end. The material handling system 100 further includes discharge chutes 110 positioned at the other end of the conveyor 102 succeeding and/or downstream of the induction station 108.

Examples of the conveyor 102 may include, but are not limited to, a sortation conveyor. According to one or more other embodiments, the conveyor 102 may be any of a cross belt loop sorter, a tilt tray sorter, pusher type sorter and the like. The conveyor 102 is configured to transfer a load 112, for example, one or more objects supported thereon, from a location to another location. The conveyor bed 104 is adapted to removably support the one or more conveyor cartridges, one of which is shown at 106 on which one or more carriers 114 are supported. In an example embodiment, the one or more carriers 114 are adapted to support the load 112. Examples of the load 112 may include, but are not limited to, articles, packages, cartons, objects, and the like that may be supported thereon. In an example embodiment, a carrier 114 is a belt. In an example embodiment, the one or more conveyor cartridges may be installed on the conveyor bed 104 along a length of the conveyor 102. The one or more conveyor cartridges are endlessly conveyed on the conveyor bed 104 in a looping direction indicated by arrows 115. For example, the one or more conveyor cartridges may be configured along the conveyor bed 104 to cause a load 112 to transfer along the one or more conveyor cartridges is the direction indicated by arrows 115. For example, the one or more conveyor cartridges may together provide a conveyor configured to carry the load 112 inducted from the induction station 108, deliver the load 112 at the discharge chutes 110, and upon delivering the load 112, return back to the induction station 108 tracing a closed loop path in the looping direction indicated by the arrows 115. In this manner, the one or more conveyor cartridges are endlessly conveyed on the conveyor bed 104 to receive the load 112 and deliver the load 112 to appropriate discharge chutes 110. The general structure of an exemplary conveyor cartridge 106 of the one or more conveyor cartridges has been shown in the breakout view in FIG. 1. The detailed construction of the exemplary conveyor cartridge 106 (as shown in FIG. 1) will be further described in conjunction with FIG. 2.

Figure 2:
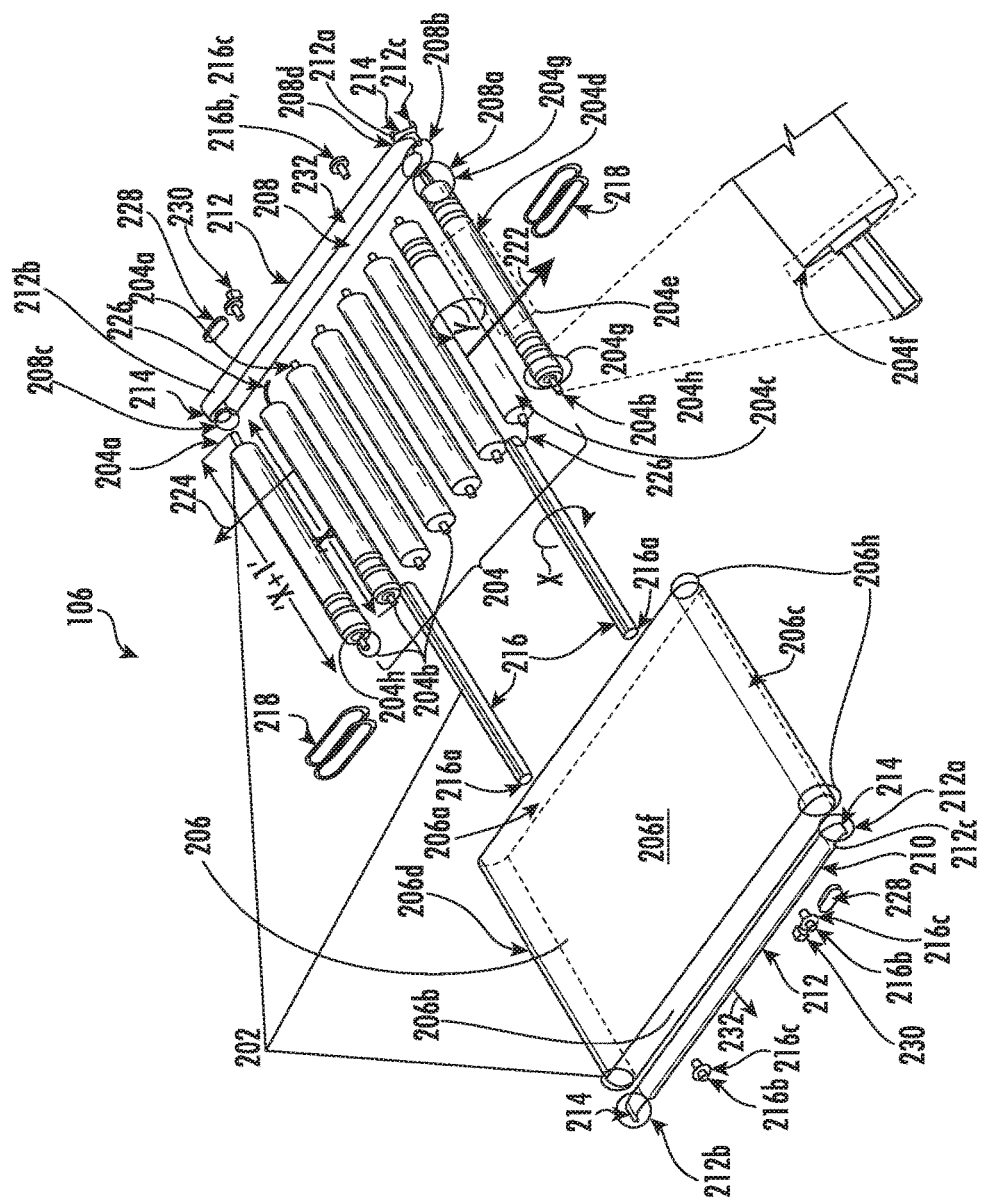
FIG. 2 illustrates an exploded view of a conveyor cartridge as shown in FIG. 1, in accordance with one or more embodiments of the present disclosure.

FIG. 2 illustrates an exploded view of a conveyor cartridge as shown in FIG. 1, in accordance with one or more embodiments of the present disclosure. The conveyor cartridge 106 as shown in FIG. 2 represents a section or a zone of a conveyor assembly, and that multiple such sections or zones may be connected together, directly, or with conveyor sections of other configurations interposed therebetween. The conveyor cartridge 106 includes a cartridge frame 202, a set of conveyor rollers 204, and a belt 206. The cartridge frame 202 includes first side plate 208 and an opposite second side plate 210, one or more extended portions 212, each extended portion 212 corresponding to one of the first side plate 208 or the second side plate 210, and one or more arcuate sloped surfaces 214, each arcuate sloped surface 214 corresponding to one of the first side plate 208 or the second side plate 210.

According to an embodiment, the first side plate 208 and the opposite second side plate 210 are a pair of spaced apart generally and/or approximately parallel frame rails, which carry a plurality of spaced apart apertures 208a, 210a (not shown) to receive the set of conveyor rollers 204. Although the first side plate 208 and the opposite second side plate 210 are illustrated as generally straight, the teachings of the present disclosure may be practiced with curved side plates conveying articles in a transport direction as indicated by arrow 222. The transport direction 222, for example, refer to a direction of travel of the articles on the conveyor assembly from a source to a destination. As seen in FIG. 2, the first side plate 208 and an opposite second side plate 210 includes the plurality of spaced apart apertures 208a, 210a (not shown) to hold the set of conveyor rollers 204. Each of the spaced apart apertures 208a, 210a (not shown) may be shaped complementarily to supporting ends 204b of each conveyor roller 204. As seen in FIG. 2, the supporting ends 204b of each conveyor roller 204 are disposed in corresponding spaced apart apertures 208a, 210a (not shown), such that the conveyor roller 204 extends in a direction that is generally and/or approximately perpendicular to the transport direction of the articles as indicated by arrow 222. The supporting ends 204b of each conveyor roller 204 are the end parts of each of the corresponding axles 204a that ducted into each conveyor roller 204 to support the corresponding conveyor roller 204 on to the first side plate 208 and second side plate 210. Each axle 204a, for example, may be of hexagonal shape and may be received in the spaced apart apertures 208a, 210a (not shown) of hexagonal shape. Further, the first side plate 208 and the second side plate 210, each of which includes opposite end portions 208b, 208c and 210b, 210c (not shown) having a curved outer periphery 208d, 210d (not shown). For example, the opposite end portions 208b, 208c and 210b, 210c are parts of the side plates located at opposite extreme ends along a longitudinal length of the side plates, wherein each part is a mirror image of one another. As seen in FIG. 2, the curved outer periphery 208d, 210d (not shown) is the mirror imaged part provided at the opposite extreme ends of the side plates.

According to an embodiment, one or more connecting rods 216 mechanically couple the first side plate 208 and the second side plate 210 together. The one or more connecting rods 216 are cylindrical rods having a rigid structure and that are non-rotatable with respect to the first side plate 208 and the second side plate 210 when installed therein. In an example, the one or more connecting rods 216 each have a radial dimension "x" that is less than the radial dimension "y" of the conveyor rollers 204 as seen in FIG. 2. In another example, at least one of the one or more connecting rods 216 has a radial dimension "x" which may be approximately equal to the radial dimension "y" of the conveyor rollers 204. The one or more connecting rods 216 includes supporting ends 216a mechanically coupled to the first side plate 208 and the second side plate 210 through hex nuts 216b and washers 216c and/or other mechanical fasteners. According to an embodiment, the one or more connecting rods 216 may be secured to the cartridge frame 202 in between the conveyor rollers 204.

As seen in FIG. 2, the conveyor rollers 204 may be classified into drive conveyor rollers 204c and end conveyor rollers 204d. The end conveyor rollers may be either a drive conveyor roller or an idler conveyor roller. As seen in FIG. 2, the end conveyor rollers 204d are embodied as idler conveyor rollers, however the drive conveyor rollers 204c may be the end conveyor rollers 204d. For example, the end conveyor rollers 204d depicted as idler conveyor roller in FIG. 2 are devoid of their own electric motor (not shown) for driving the conveyor roller and in contrast the drive conveyor rollers 204c which are each coupled to a corresponding electric motor (not shown) for driving the conveyor roller. For example, drive conveyor rollers 204c are self-driven conveyor rollers with an internal motor which is operable to rotate a conveyor roller portion relative to the axle of the conveyor roller. In contrast to the drive conveyor rollers 304c, the end conveyor rollers 204d are freely rotating conveyor rollers. According to an embodiment, the drive conveyor rollers 204c are Motor Driven Conveyor rollers (MDR). The motor driven conveyor rollers (MDR) may be positioned as end conveyor rollers 204d or may be positioned before the end conveyor rollers 204d along the transportation direction indicated by arrow 222. The motor driven conveyor rollers, for example, may include a DC brushless motor and may be operable at varying speeds to output varying torque to the motor driven conveyor roller. The drive conveyor rollers 204c and the end conveyor rollers 204d in FIG. 2 are illustrated as sequenced in a straight line positioned perpendicular to transport direction indicated by arrow 222, however, in alternate embodiments, the drive conveyor rollers 204c and the end conveyor rollers 204d may be skewed conveyor rollers positioned at a desired skew angle. The one or more connecting rods 216 may be positioned immediately following the drive conveyor roller 204c as seen in FIG. 2, however, other locations on the cartridge frame for positioning the one or more connecting rods 216 are considered.

According to an embodiment, the end conveyor rollers 204d may be positioned at opposite end 208b, 208c and 210b, 210c (not shown) of the side plates 208, 210 of the cartridge frame 202. For example, one end conveyor roller may positioned at a downstream end of the cartridge frame 202 and the other end conveyor roller positioned at an upstream end of the cartridge frame 202. For example, the upstream end of the cartridge frame is located in proximity to the upstream direction indicated by arrow 224, and the downstream end of the cartridge frame located in proximity to the downstream direction or transport direction indicated by arrow 222.

According to an embodiment, the end conveyor rollers 204d may include one or more crowns or bumps (not shown) along a central portion 204e of the conveyor rollers 204 to assist in tracking of a belt reeved around the conveyor rollers 204. According to another embodiment, the end conveyor rollers may include one or more tapered depressions 204f (as shown in the break out view of FIG. 2) at opposite end portions 204g of the conveyor rollers 204 as seen in FIG. 2. For example, the opposite end portions 204g of the conveyor rollers 204 refer to parts located at opposite extreme ends along a transverse width of the conveyor rollers 204, wherein each part is a mirror image of one another, and the central portion 204e of the conveyor rollers 204 refer to parts located in between the opposite extreme ends. In FIG. 2, the mirror imaged parts located on the opposite extreme ends are the tapered depressions 204f formed on the end conveyor rollers 204d. The part between the opposite extreme ends is the crowns or bumps (not shown) formed on the central portion 204e of the end conveyor rollers 204d. In an example, the bumps or crowns (not shown) may include one or more slightly larger diameter regions, for example, a larger diameter than a diameter of generally cylindrical portion of the end conveyor roller, which may be typically having a standard diameter. On the other hand, the tapered depressions 204f may include one or more slightly smaller diameter regions, for example, a smaller diameter than the diameter of the generally cylindrical portion of the end conveyor roller, which may be typically having a standard diameter. The bumps or crowns or tapered depressions 204f may be formed as part of the end conveyor rollers 204d as seen in FIG. 2 or may comprise molded portions, such as molded polyurethane portions or the like, positioned along the end conveyor rollers 204d, without affecting the scope of the present disclosure. In an example embodiment, each roller 204 of the conveyor cartridge 106 may comprise a similar bump, crown, and/or tapered depression 204f.

Figure 4:
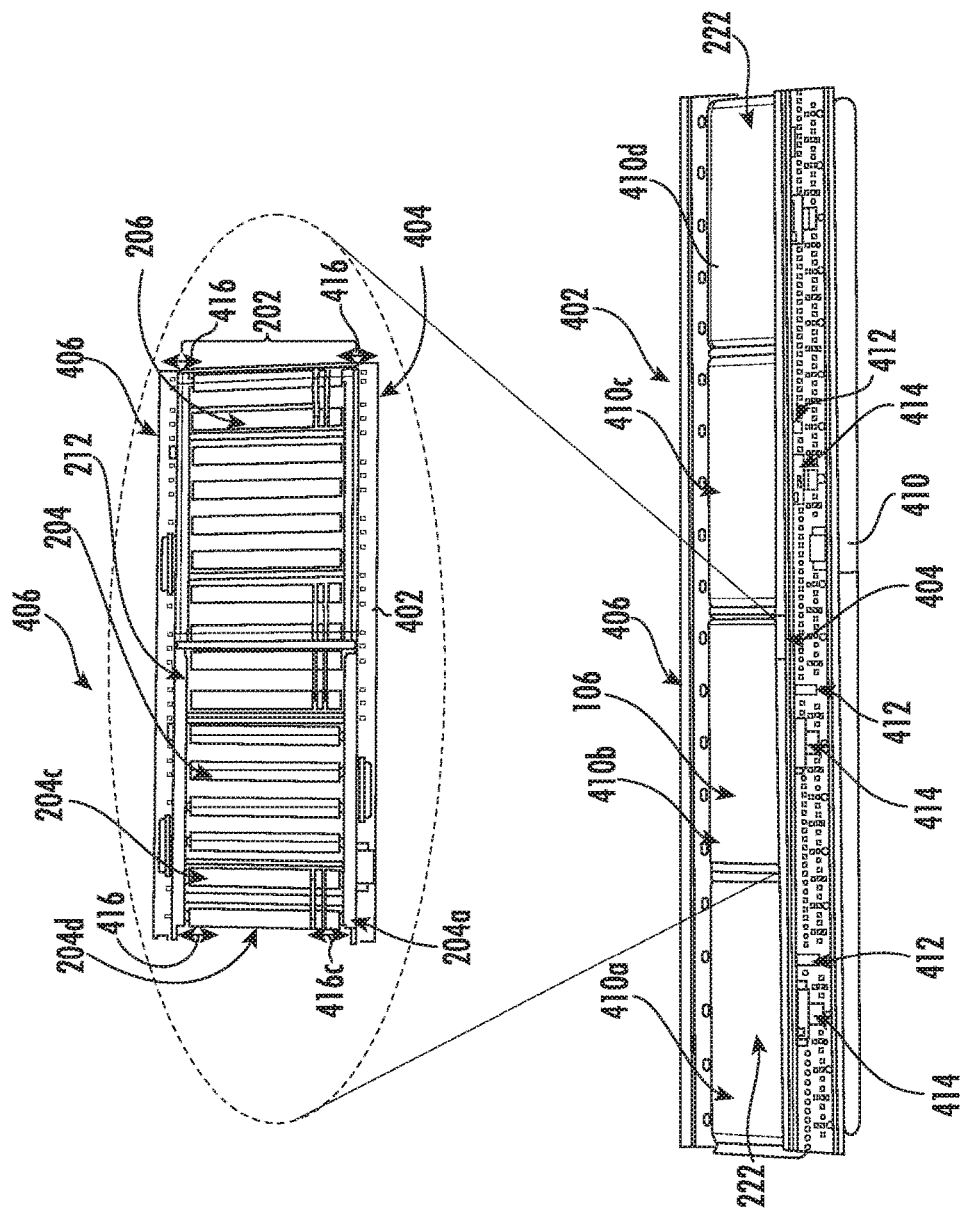
FIG. 4 illustrates a top view of the conveyor cartridge of FIG. 2 when installed on conveyor rails of a conveyor frame, in accordance with one or more embodiments of the present disclosure.

According to an embodiment, the axles 204a protruding out of the end conveyor rollers 204d may be longer than the axles protruding from the other conveyor rollers 204 on the cartridge frame 202. The protruding portion 204h of the axles 204a may protrude through the spaced apart apertures 208a, 210a (not shown) on the first side plate 208 and the second side plate 210 and may be seated on axle retaining members (not shown) of the conveyor frame (as shown in FIG. 4). For example, length of the axles 204a of other conveyor rollers 204 may be "X", and the length of the axles 204a of the end conveyor rollers 204d may be "X+1" or longer. The axles 204a of the other conveyor rollers 204 having a length value "X" may be seated on the spaced apart apertures 208a, 210a (not shown) of the first side plate 208 and the second side plate 210 and may terminate just beyond the spaced apart apertures 208a, 210a (not shown). In contrast, the axles 204a of the end conveyor rollers 204d having a length value "X+1" may be seated on the spaced apart apertures 208a, 210a (not shown) of the first side plate 208 and the second side plate 210 and may extend beyond the spaced apart apertures 208a, 210a (not shown) to make a contact with the axle retaining members (not shown) of the conveyor frame 402 (as shown in FIG. 4). In this manner, only the axles 204a of the end conveyor rollers 204d may come into contact with the conveyor frame (as shown in FIG. 4) and axles 204a of the other conveyor rollers 204 may contact the cartridge frame 202 but do not extend outward from the cartridge frame 202 enough to engage the conveyor frame 402.

Although shown as having multiple conveyor rollers spread along the cartridge frame, the present disclosure may also include a support plate, a slider pan, or slider bed (not shown) between the drive conveyor rollers and the end conveyor rollers and the slider bed and/or the like (not shown) may support the belt, without affecting the scope of the present disclosure. According to an embodiment, the slider bed and/or the like (not shown) may comprise separate plates positioned between two consecutive conveyor rollers or may comprise a plate having multiple slots or openings therethrough for the conveyor rollers to protrude upward partially through the opening and provide rolling support for the articles along the slider bed and/or the like (not shown), without affecting the scope of the present disclosure. For example, the first side plate 208 and the second side plate 210 of the cartridge frame 202 may include dedicated apertures to receive the slider bed and/or the like in addition to the conveyor rollers.

According to an embodiment, the drive conveyor roller 204c is operable to rotatably drive the end conveyor rollers 204d, such as via O-rings 218 or the like. The drive conveyor roller 204c and the end conveyor rollers 204d are grooved at 220, as shown in FIG. 2, for reception of the O-rings 218, each of which is looped around the drive conveyor rollers 204c and around the associated one of the end conveyor rollers 204d. The O-rings 218 frictionally engage the drive conveyor roller 204c and the associated one of the end conveyor rollers 204d. Depending upon the application, each of the end conveyor rollers 204d and the drive conveyor rollers 204c may have one or more of different O-rings 218 thereon. Rotation of the drive conveyor rollers 204c will act through the O-rings 218 to rotate the associated end conveyor rollers 204d about their rotation axes.

Figure 3A:
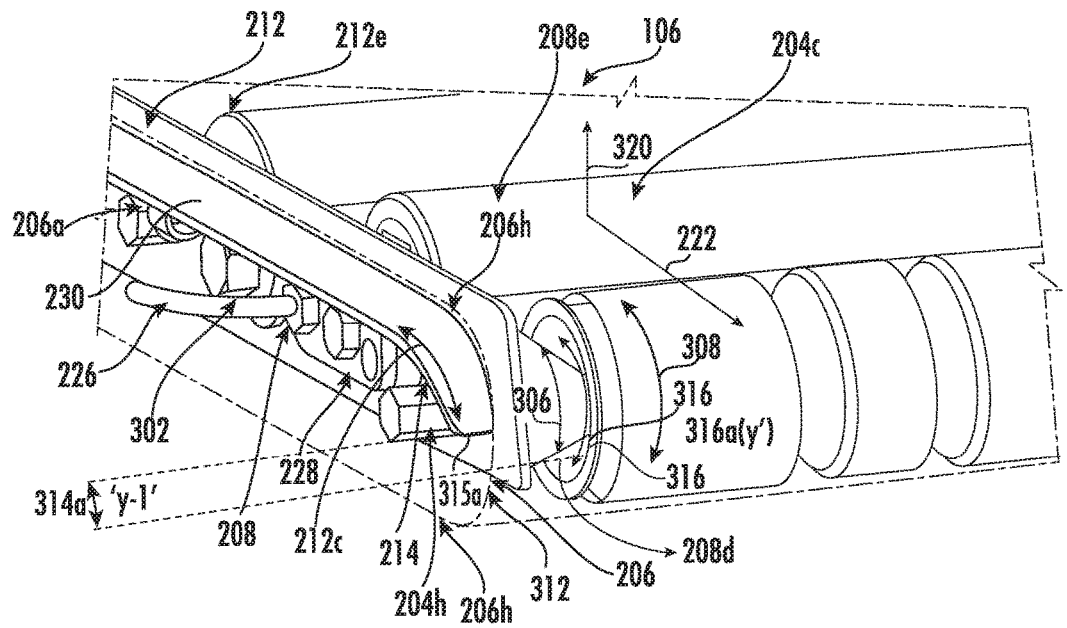
FIG. 3A illustrates a perspective view of an extended portion of the conveyor cartridge of FIG. 2, in accordance with one or more embodiments of the present disclosure.

According to an embodiment, a drive cable 226 is ducted through the axle 204a of the drive conveyor roller 204c The electric motor (not shown) of the drive conveyor roller 204c is linked via the drive cable 226 ducted through an opening in the axle 204a to connect with the drive electronics or drive card (as shown in FIG. 4) attached to the conveyor frame (as shown in FIG. 4. The drive cable 226 extends beyond the first side plate 208 and/or the second side plate 210 as shown in FIG. 3A. An axle lock 228 is provided at the first side plate 208 and the second side plate 210 to prevent movement of the axles 204a of the drive conveyor rollers 204d caused by vibration of the drive conveyor roller 204d when the drive conveyor roller 204c experiences a torque from the electric motor (not shown) for rotation. This vibration may be caused as the supporting ends 204b of the axles 204a are provided with a clearance on their respective spaced apart apertures 208a, 210a (not shown) of the first side plate 208 and the second side plate 210. According to an embodiment, a hex nut 228a may be provided to hold the axle lock 228 in place with respect to the first side plate 208 and the second side plate 210. A cable hanger 230 is provided on the first side plate 208 and/or the second side plate 210 for receiving any cable or wiring associated with the drive electronics or drive card (as shown in FIG. 4) of the conveyor frame 402 (as shown in FIG. 4).

Figure 3B:
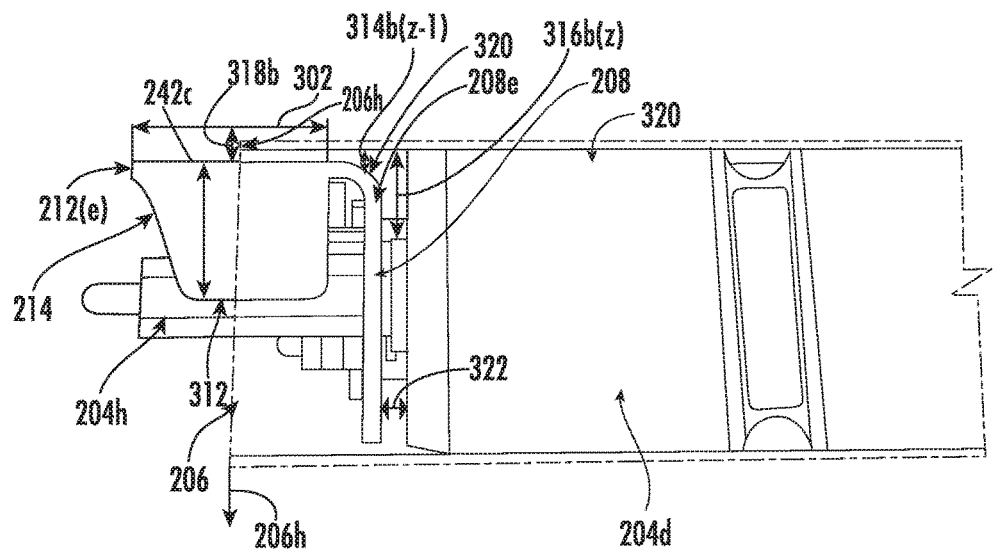
FIG. 3B illustrates a front view of an arcuate sloped surface of the extended portion of the conveyor cartridge of FIG. 2, in accordance with one or more embodiments of the present disclosure.

According to an embodiment, the belt 206 is an elastic stretchable belt having a rubber or other rubberlike material. The belt 206 is transversely or longitudinally extending having high modulus material permitting stretching of the belt 206. As seen in FIG. 2, the belt 206 may be wide enough to cover a full width of the conveyor rollers 204. For example, the full width of the conveyor rollers 204 refer to a width of the conveyor rollers 204 including the axles 204a protruding out from each of the conveyor rollers 204. The belt 206 may be stretched beyond the full width of the conveyor roller 204 to substantially span a spacing or a gap (322 as shown in FIG. 3B) between the first and second side plates 208, 210 and protruding portion 204h of the axles 204a of the conveyor rollers 204 (as shown in FIG. 3B). Thereby, the belt 206 provides a wide conveying surface for conveying articles along the belt 206 in the transport direction indicated by arrow 222. According to an embodiment, the belt 206 includes opposite side portions 206a, 206b, front portion 206c, rear portion 206d, a top portion 206f and bottom portion 206g (not shown) of the belt 206 located in between the front portion 206c and the rear portion 206d. The opposite side portions 206a, 206b are mirror images of each other, for example, the opposite side portions 206a, 206b refers to a part of the belt 206 facing the conveyor rails 404, 406 of the conveyor frame 402 (as shown in FIG. 4) and running parallel to the conveyor rails. The front portion 206c, for example, refers to a part of the belt 206 located at the downstream end running perpendicular to the conveyor rails (as shown in FIG. 4). The rear portion 206d, for example, refer to a part of the belt 206 located at the upstream end running perpendicular to the conveyor rails (as shown in FIG. 4).

The belt 206 may be initially stretched at the edges 206h of the side portions 206a, 206b as it is reeved or slid around the cartridge frame 202, such that the belt 206 has an initial stretch and continues to stretch in a lengthwise direction at the a top portion 206f and bottom portion 206g (not shown) parallel to the transportation direction 222 when slid around the conveyor rollers 204. The belt 206 provides a substantially greater amount of stretch over conventional strip belts or conveyor belts, which may substantially cover only the generally cylindrical conveyor roller portions or central portions 204e of the conveyor rollers 204. Moreover, the belt 206 may provide a great surface area to act as a carrier 114 than conventional strip belts or conveyor belts, which may substantially cover only the generally cylindrical conveyor roller portions or central portions 204e of the conveyor rollers 204.

According to an embodiment, one or both of the first side plate 208 and the second side plate 210 includes an extended portion 212. In an example embodiment, an extended portion 212 is integrally formed on a top surface 208e of one or both of the first side plate 208 and the second side plate 210. The extended portion 212 overhangs or extends outward beyond the first side plate 208 and the second side plate 210 in the direction indicated by arrow 232 transverse to the transport direction 222. For example, an extended portion 212 may extend outward beyond a corresponding one of the first side plate 208 and the second plate in a direction defined by and/or approximately parallel to the rotation axis of one or more of the conveyor rollers 204. The extended portion 212 extends along the length of the corresponding one of the first side plate 208 and the second side plate 210. According to an embodiment, the extended portion 212 may extend beyond the length of the first side plate 208 and the second side plate 210. For example, the protruding portion 204h of the axles 204a of the conveyor roller 204 and the end conveyor rollers 204d may be supported on their corresponding spaced apart apertures 208a, 210a (not shown) provided on the first and second side plates 208, 210 and the extended portion 212 on the top surface 208e of the first and second side plates 208, 210 extends in the direction indicated by arrow 232 to cover the axles 204a. Further, each of the extended portions 212 includes arcuate sloped surfaces 214 integrally formed on opposite end portions 212a, 212b of the extended portion 212 of the corresponding side plate 208, 210. For example, the opposite end portions 212a, 212b of the extended portion 212 refers to parts located at opposite extreme ends along the longitudinal length of the extended portion 212, wherein each part is a mirror image of one another. As shown in FIG. 2, the arcuate sloped surface 214 is the mirror imaged part of the extended portion 212 at the opposite extreme end. The arcuate sloped surface 214 is downwardly bowed on the opposite end portions 212a, 212b to define a curved head portion 212c and a curved tail portion 212d (not shown) for the extended portion 212 of both the side plates 208, 210. According to an embodiment, the curved head portion 212c extends beyond the length of the first side plate 208 and the second side plate 210 in the downstream direction 222 and the curved tail portion 212d extends beyond the length of the first side plate 208 and the second side plate 210 in the upstream direction 224.

FIG. 3A illustrates a perspective view of an extended portion of the conveyor cartridge of FIG. 2, in accordance with one or more embodiments of the present disclosure. In FIG. 3A, the extended portion 212 on the top surface 208e (as clearly shown in FIG. 3B) of the first side plate 208 is depicted. The arcuate sloped surface 214, which forms a curved head portion 212c at the downstream end of the extended portion 212, is shown along with the first side plate 208. It will be understood that curved tail portion 212d (not shown) of the extended portion 212 is a mirror imaged part of the curved head portion 212c. As seen in FIG. 3A, the belt 206 of FIG. 2 is slid over the conveyor rollers 204 covering a full width of the conveyor rollers 204 and extending beyond the full width of the conveyor rollers 204 to cover the extended portion 212 of the first side plate 208. According to an embodiment, the belt 206 partially covers a width 302 of the extended portion 212 as seen in FIG. 3A. According to another embodiment, the belt 206 may fully cover the width 302 of the extended portion 212. As seen in FIG. 3A, the extended portion 212 partially covers the protruding portion 204h of the axle 204a of the end conveyor roller 204d, and fully covers the axles 204a of the other conveyor rollers 204. Further, the extended portion 212 covers the cable hanger 230, the axle lock 228, and drive cable 226 of the drive conveyor roller 204c. For example, the extended portion 212 may extend outward from the corresponding one of the first plate 208 and the second plate 210 a distance that is at least as long as the distance that one or more of the cable hanger 230, axel lock 228, and/or drive cable 226 extends outward from the corresponding one of the first plate 208 and the second plate 210.

According to an embodiment, the arcuate sloped surface 214 forming the curved head portion 212c includes a curved dimension indicated by arrows 304 substantially equal to the curved dimension indicated by arrows 306 of the curved outer periphery 208d of the first side plate 208. According to another embodiment, the arcuate sloped surface 214 forming the curved head portion 212c includes a curved dimension 304 substantially equal to one half of the outer radial circumference 308 of the end conveyor roller 204d. For example, the arcuate sloped surface 214 may be defined by a radius of curvature that is equal to the outer radius of the end conveyor roller 204d (e.g., the largest radius of the roller of the end conveyor roller 204d). According to another embodiment, the arcuate sloped surface 214 forming the curved head portion 212c includes a curved dimension 304 substantially equal to one half of the inner radial circumference 310 of the end conveyor roller 204d. For example, the arcuate sloped surface 214 may be defined by a radius of curvature that is equal to the inner radius of the end conveyor roller 204d (e.g., the smallest radius of the roller of the end conveyor roller 204d).

According to an embodiment, the one half of the outer radial circumference 308 of the end conveyor roller 204d and a leading edge 312 of the curved head portion 212c is provided at a first offset distance 314a. For example, when the end conveyor roller 204d is inserted into the corresponding spaced apart aperture 208a on the first side plate 208, a first protruding portion 316a of the end conveyor roller 204d extends and/or projects out beyond the first side plate 208 in a direction indicated by arrow 318, which is parallel to the transport direction 222. In an example embodiment, the first protruding portion 316a protrudes from the axle 204a of the end conveyor roller 204d. For example, the first protruding portion 316a of the end conveyor roller 204d refers to a part of the end conveyor roller 204d projecting out in either an upstream direction 224 or a downstream direction 222 at a longitudinal distance away from the first side plate 208 of the cartridge frame 202. The length of the first protruding portion 316a projecting out of the first side plate 208 may be "Y" and the leading edge 312 of the curved head portion 212c is at the first offset distance 314a from the protruding portion 316a of the end conveyor roller 204d projecting out from the first side plate 208. The first offset distance 314a between the leading edge 312 and the first protruding portion 316a may be "Y-1". As should be understood, the end conveyor roller 204d may further comprise another first protruding portion 316a which is proximate the second side plate 210 and extends and/or projects out beyond the second side plate 210 in the direction indicated by arrow 318, which is parallel to the transport direction.

In operation, when the belt 206 is slid over the extended portion 212, the edge 206h of the leading side portion 206a, 206b of the belt 206 as seen in FIG. 2 is initially stretched to cover the extended portion 212. When the side portions 206a, 206b (not shown in FIG. 3A) of the belt 206 are slid over the end conveyor rollers 204d from the extended portion 212, the belt 206 is further stretched to cover the first offset distance 314a, for example, "Y−1". Therefore, when the belt 206 covers this first offset distance 314a, a desired tension of the belt 206 will be maintained between the conveyor rollers 204 and the belt 206. For example, the desired tension being a minimum required tension between the belt 206 and the conveyor rollers 204 to prevent folding or wrinkling or loosening of the belt 206 under operating conditions. In an alternate embodiment, the first offset distance 314a may be created after sliding the belt 206 over the extended portion 212 of the first side plate 208. For example, the end conveyor roller 204d may be removed from the cartridge frame 202 and then the belt 206 may be slid over the extended portions 212 of the first side plate 208 as shown in FIG. 5. After the belt 206 is slid over the extended portion 212 to cover the cartridge frame 202, the end conveyor rollers 204d removed from the cartridge frame 202 are reinserted in order to create the first offset distance 314a between the leading edge 312 of the curved head portion 212c and the first protruding portion(s) 316a of the end conveyor roller 204d. The first offset distance 314a created by the reinserting the end conveyor roller 204d produces a stretching of the a top portion 206f and bottom portion 206g (not shown) of the belt 206 in a lengthwise direction parallel to the transport direction 222. This stretching of the a top portion 206f and bottom portion 206g (not shown) creates the desired tension between the end conveyor roller 204d and the belt 206.

The first offset distance 314a between the first protruding portion(s) 316a of the end conveyor roller 204d and the leading edge 312 of the curved head portion 212c may provide a first clearance 318a between the curved head portion 212c and the belt 206, when the belt 206 is slid over the cartridge frame 202. This first clearance 318a is utilized by an operator to remove the belt 206 during a maintenance activity without the operator's fingers being caught between the conveyor rollers 204 and the belt 206 or between the extended portion 212 and the belt 206.

FIG. 3B illustrates a front view of an arcuate sloped surface of the extended portion of the conveyor cartridge of FIG. 2, in accordance with one or more embodiments of the present disclosure. As shown in FIG. 3B, the arcuate sloped surface 214, for example, may be tapered in width. As shown in FIG. 3B, a semi-arched portion 320 is integrally formed between the top surface 208e of the first side plate 208 and the extended portion 212. The semi-arched portion 320 may extend throughout the length of the extended portion 212. For example, the semi-arched portion 320 may be provided to generally increase a width of the extended portion 212.

As seen in FIG. 3B, when the belt 206 is slid over the extended portion 212 to cover the first offset distance 314a as shown in FIG. 3A, a second clearance 318b is created in addition to the first clearance 318a. The second clearance 318b is created between a top surface 212e (as shown in FIG. 3A) of the extended portion 212 and the belt 206. This second clearance 318b is utilized by an operator to remove the belt 206 during a maintenance activity without the operator's fingers being caught between the conveyor rollers 204 and the belt 206 or between the extended portion 212 and the belt 206.

According to an embodiment, the top surface 212e of the extended portion 212 is provided at a second offset distance 314b from a second protruding portion 316b of the end conveyor roller 204d. For example, the second protruding portion 316b is a part of the end conveyor roller 204d projecting out in a direction transverse to the upstream direction 224 and the downstream direction 222 away from the top surface 208e of the first side plate 208 or the extended portion 212. For example, the second protruding portion 316b may extend out from the axle 204a of the end conveyor roller 204d. In an example, when the end conveyor roller 204d is inserted on and/or secured relative to the first side plate 208, the second protruding portion 316b of the end conveyor roller 204d projects out beyond and/or above the first side plate 208 in a direction indicated by arrow 320, which is approximately perpendicular to the transport direction 222. For example, the second protruding portion 316b may project and/or extend out from the end conveyor roller 204d in a direction that is transverse and/or perpendicular to both the transport direction as indicated by arrow 222 and a direction defined by the conveyor roller width and/or the length of the conveyor rollers (e.g., which is parallel to arrow 232). For example, the length of the second protruding portion 316b extending and/or projecting out beyond and/or above the first side plate 208 may be "Z" and the top surface 212e of the extended portion 212 is at the second offset distance 314b from the second protruding portion 316b. The second offset distance 314b between the extended portion 212 and the second protruding portion 316b may be "Z−1". As should be understood, the end conveyor roller 204d may further comprise another second protruding portion 316b which is proximate the second side plate 210 and extends and/or projects out beyond and/or above the second side plate 210 in the direction indicated by arrow 320, which is transverse and/or perpendicular to the transport direction.

In alternate embodiments, the second offset distance 314b may be created after sliding the belt 206 over the extended portion 212 of the first side plate 208. For example, the end conveyor roller 204d may be removed from the cartridge frame 202 and then the belt 206 may be slid over the extended portion 212 of the first side plate 208 as shown in FIG. 5. After the belt 206 is slid to cover the extended portion 212, the end conveyor roller 204d removed from the cartridge frame 202 is reinserted in to the cartridge frame 202 in order to create the second offset distance 314b between the top surface 212d of the extended portion 212 and the second protruding portion 316b of the end conveyor roller 204d, thereby creating the second clearance 318b between the extended portion 212 and the belt 206. This second clearance 318b is utilized by an operator to remove the belt during a maintenance activity without the operator's fingers being caught between the conveyor rollers 204 and the belt 204 or between the extended portion 212 and the belt 206. As seen in FIG. 3B, the belt 206 may be stretched beyond the full width of the conveyor roller 204 to substantially span a spacing or a gap 322 between the first side plate 208 and the protruding portion 204h of the axle 204a of the end conveyor roller 204a. Similarly, the belt 206 may be stretched beyond the full width of the conveyor roller 204 to substantially span a spacing or a gap 322 between the second side plate 210 and the protruding portion 204h of the axle 204a of the end conveyor roller 204a.

FIG. 4 illustrates a top view of the conveyor cartridge of FIG. 2 when installed on conveyor rails of a conveyor frame, in accordance with one or more embodiments of the present disclosure. As seen in FIG. 4, the conveyor frame 402 includes first side rail 404 and a second side rail 406. The conveyor cartridge 106 is removably coupled with the first side rail 404 and the second side rail 406 of the conveyor frame 402. The conveyor cartridge 106 is installed on the conveyor frame 402 with axles 204a protruding out of the end conveyor rollers 204d. The protruding portion 204h of the axles 204a of the end conveyor rollers 204d (shown in the break out view of FIG. 4) may contact axle retaining members (not shown) on the conveyor frame 402 to support the conveyor cartridge 106. As each conveyor cartridge 106 is dedicated to each zone of a conveyor section, a maintenance activity may be performed at ease for each zone at a minimal time. For example, when a maintenance activity is to be performed on a particular zone from among the other zones of the conveyor section, the conveyor cartridge 106 of the particular zone may be removed and easily replaced by a substitute conveyor cartridge without shutting down the conveyor assembly.

In the illustrated embodiment of FIG. 4, a conveyor section 410 is shown with four zones 410a, 410b, 410c and 410d, with each zone having a conveyor cartridge 106 installed therein. The number of zones along the conveyor section 410 is a function of the application and may vary without affecting the scope of the present disclosure. Each zone may include article sensors 412 and their respective drive electronics or drive card 414 to drive the belt 206 of the conveyor cartridge 106 along the transport direction indicated by arrow 222. For example, the drive cable 226 of a conveyor cartridge 106 installed in a first zone may be operatively attached and/or secured to the drive electronics and/or drive card 414 corresponding to the first zone. The article sensors 412 comprise photo-eye sensors positioned at a downstream end of a respective zone and operable to detect products or articles as they move from the downstream end of one zone to the upstream end of the next, adjacent zone. The drive conveyor roller 204c of a particular zone may be selectively activated or deactivated by the drive electronics or drive card 414 of the particular zone in response to inputs from corresponding article sensors 412, or in response to more than one of the article sensors 412 positioned along the conveyor section 410. The drive conveyor roller 204c may drive the end conveyor roller 204d to rotate the belt 206 (or to cease and/or stop rotating the belt) in order to move or stop an article or articles that is/are present on top of the belt 206 on that particular zone. The drive conveyor rollers 204c thus may be directly driven and operable to selectively and independently convey or accumulate one or more articles on the associated conveyor zones in response to one or more of the article sensors 412 and/or a signal provided to the drive electronics and/or drive card 414 by one or more of the article sensors 412. For example, accumulation of articles begins when a first article is forced to remain in Zone 1. The photo eye 412 in Zone 1 detects the first article and turns off the drive conveyor roller in Zone 1, stopping all the conveyor rollers 204 in that zone. When a second article is detected by the photo eye 414 in Zone 2, the drive conveyor roller 204c in Zone 2 is turned off, stopping all the conveyor rollers 204 in that zone, wherein Zone 2 is the zone adjacent to and upstream of Zone 1. This accumulation sequence is repeated for each succeeding zone as long as the first article in Zone 1 is forced to remain in position. When the first article in Zone 1 can be released, the drive conveyor roller 204c is turned on and the first article moves down the conveyor section in to the downstream zone adjacent to Zone 1. When the first article clears the photo eye in Zone 1, the drive conveyor roller 204c in Zone 2 is turned on and the second article moves from Zone 2 downstream to Zone 1. In this manner, one or more articles may be accumulated in each zone and may be moved into subsequent zones on the conveyor section 410.

In the illustrated embodiment of FIG. 4, when the conveyor cartridge 106 is installed on the conveyor frame 402, the extended portion 212 on the top surface 208e of the first side plate 208 and the second side plate 210 of the cartridge frame 202 as shown in FIG. 3A and FIG. 3B covers a gap 416 that exists between the cartridge frame 202 and the conveyor frame 402. For example, when the cartridge frame 202 is installed on the conveyor frame 402, there exists a gap 416 between the conveyor rollers 204 and the conveyor frame 402. This gap 416 is covered by the extended portion 212 provided on the cartridge frame 202. In the illustrated embodiment, the sliding belt 206 is shown to be partially covering the extended portion 212 to provide a flat large conveying surface for the articles to be transported. According to an embodiment, the sliding belt 206 may fully cover the extended portion 212. The extended portion 212 provided on the cartridge frame 202 facilitates the conveyor cartridge 106 to be used with wide varieties of articles, for example, small articles, flat mails, polybags and large cartons, as the gap 416 between the conveyor frame 402 and the cartridge frame 202 is completely closed or covered. Thereby, a risk of small and fragile articles being caught in the gap 416 and the article being damaged due to packaging get caught in the gap 416 is mitigated.

Figure 5A:
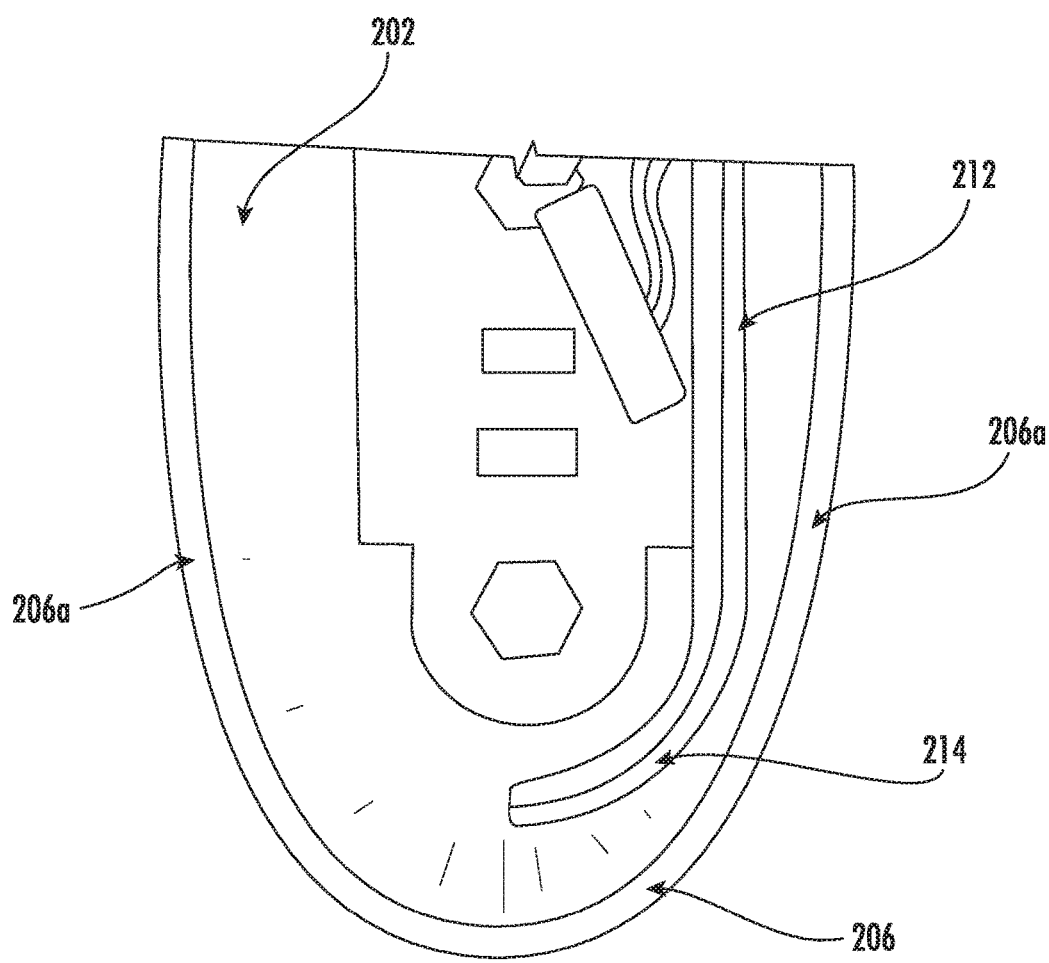
FIGS. 5A and 5B illustrate side views of the arcuate sloped surface of the extended portion with a belt sliding over the arcuate sloped surface, in accordance with one or more embodiments of the present disclosure.
Figure 5B:
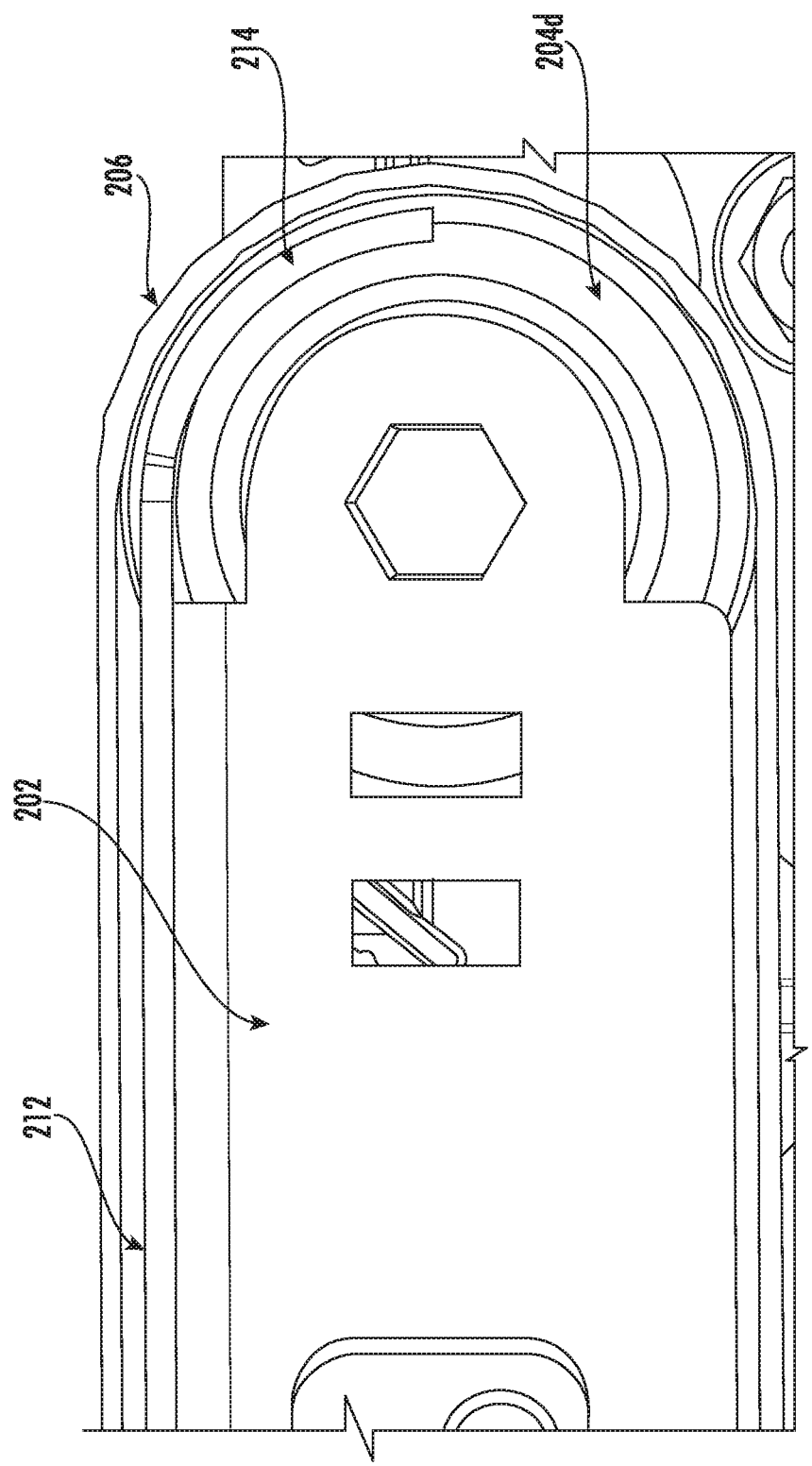

FIGS. 5A and 5B illustrates a side view of the arcuate sloped surface of the extended portion with a belt sliding over the arcuate sloped surface, in accordance with one or more embodiments of the present disclosure. As seen in FIG. 5A, the belt 206 is slid on the cartridge frame 202 over the extended portion 212 of the cartridge frame 202. The belt 206 is initially stretched to insert either of the opposite side portions 206a, 206b of the belt 206 into contact with the arcuate sloped surface 214 of the extended portion 212. The arcuate sloped surface 214 defining the curved head portion 212c and the curved tail portion 212d of the extended portion 212 abuts against the belt 206 during sliding action of the belt 206 on the cartridge frame 202. For example, when a maintenance activity is performed by an operator on the conveyor cartridge 106, one of the end conveyor rollers 204d (as shown in FIG. 3A) of the cartridge frame 202 is removed, and as a result, a desired tension between the belt 206 and the other conveyor rollers 204 (as shown in FIG. 2) is removed. Subsequent to removing one of the end conveyor roller 204d, the belt 206 is removed out of contact with the conveyor rollers 204 by the operator holding either of the opposite side portions 206a, 206b of the belt 206 extending over the arcuate sloped surface 214. The cartridge frame 202 with the one of the end conveyor rollers 204d removed from the cartridge frame 202 is shown in FIG. 5A. As seen in the FIG. 5A, the belt 206 is now released from the desired tension and is ready for removal by the operator. According to an embodiment, the operator may hold either the front portion 206c (as shown in FIG. 2), the rear portion 206d (as shown in FIG. 2) or opposite side portions 206a, 206b of the belt 206 to slide the belt 206 out of contact from the cartridge frame 202. After the maintenance activity has been performed, the operator may reinsert or slide back the belt 206 over the cartridge frame 202 in a like manner as it was removed from the cartridge frame 202. When reinserting, either of the opposite side portions 206a, 206b of the belt 206 may be initially stretched to make a contact with the curved head portion 212c and the curved tail portion 212d of the arcuate sloped surfaces 214 and then the belt 206 is slid over the extended portion 212 and the other conveyor rollers 204 on the cartridge frame 202 to cover the full width of the conveyor rollers 204. Subsequent to reinserting the belt 206 back into the cartridge frame 202, the end conveyor roller 204d removed from the cartridge frame 202 is reinserted back into cartridge frame 202. When reinserting the end conveyor roller 204d, the a top portion 206f (as shown in FIG. 2) and bottom portion 206g (not shown) of the belt 206 stretches in a direction parallel to the transport direction 222 and the stretching facilitates the desired tension to be regained. The cartridge frame 202 with the end conveyor roller 204d reinserted into the cartridge frame 202 is shown in FIG. 5B. As seen in the FIG. 5B, the belt 206 is now reinserted with the desired tension and is ready for installation on a zone of the conveyor section 410 (as shown in FIG. 4) by the operator. Therefore, the operator may perform the maintenance activity at a short span of time by quickly removing and reinserting the belt 206 from the cartridge frame 202 while still maintaining the desired tension.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. For example, the construction of the conveyor cartridge frame may be reversed or otherwise modified, so that the extended portion is removably coupled to the side plates of the conveyor cartridge frame. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In addition, it should be understood that the figures, which highlight the structure, methodology, functionality and advantages of the present disclosure, are presented as examples only. The present disclosure is sufficiently flexible and configurable, such that it may be implemented in ways other than that shown in the accompanying figures.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements are equally contemplated by the present disclosure.

The invention claimed is:

1. A conveyor system comprising:
a conveyor frame with a first side rail and a second side rail;
a conveyor cartridge removably coupled with the first side rail and a second side rail of the conveyor frame, wherein the conveyor cartridge comprises:
a cartridge frame comprising:
a first side plate and an opposite second side plate that delimit a direction of the conveyor cartridge transverse to transport direction;
two extended portions, each extended portion integrally formed on a top surface of one of the first side plate or the second side plate and extending outwardly from the top surface of the corresponding one of the first side plate and the second side plate in the direction transverse to the transport direction; and
arcuate sloped surfaces integrally formed on opposite end portions of each of the extended portions, wherein the arcuate sloped surfaces are downwardly bowed on the opposite end portions to define a curved head portion and a curved tail portion for the extended portions;
conveyor rollers rotatably mounted to axles and extending a conveyor roller width between the first side plate and the second side plate, wherein an axle of at least one of the conveyor rollers protrudes out through the first side plate and the second side plate; and
a belt slidably engaged to the cartridge frame fully covering the conveyor rollers and extending beyond the conveyor rollers covering at least a portion of each of the extended portions.

2. The conveyor system of claim 1, wherein the extended portions extend outwardly from the corresponding one of the first side plate and the second side plate uniformly throughout the length of the first side plate and the second side plate.

3. The conveyor system of claim 1, wherein the curved head portion and the curved tail portion extend beyond the length of the first side plate and the second side plate.

4. The conveyor system of claim 1, wherein at least one of the curved head portion and the curved tail portion is proximal to the at least one of the conveyor rollers with axles protruding out through the first side plate and the second side plate.

5. The conveyor system of claim 1, wherein (a) the arcuate sloped surface includes a curved dimension substantially equal to the curved dimension of one half of the outer radial circumference of the at least one of the conveyor rollers, and (b) the arcuate sloped surface encloses a substantial portion of the protruding axles.

6. The conveyor system of claim 1, wherein when the conveyor cartridge is installed on the conveyor frame, a protruding portion of the axle of the at least one of the conveyor rollers mechanically couples to axle retaining members on the first side rail and the second side rail of the conveyor frame.

7. The conveyor system of claim 1, wherein when the conveyor cartridge is installed on the conveyor frame, one of the extended portions abuts against the first side rail and another of the extended portions abuts against the second side rail and thereby covering any gaps existing between the cartridge frame and the conveyor frame.

8. The conveyor system of claim 1, wherein first side plate and the second side plate each comprise one or more apertures to receive axles of the conveyor rollers.

9. The conveyor system of claim 1, wherein the at least one of the conveyor rollers comprises a first protruding portion and a second protruding portion.

10. The conveyor system of claim 9, wherein the first protruding portion of the at least one of the conveyor rollers projects out beyond the first side plate in a direction parallel to the transport direction, and wherein the second protruding portion of the at least one of the conveyor rollers projects out in a direction transverse to both the transport direction and a direction defined by the conveyor roller width.

11. The conveyor system of claim 10, wherein a first offset distance is provided between the first protruding portion and a leading edge of the arcuate sloped surface creating a first clearance between the arcuate sloped surface and the belt.

12. The conveyor system of claim 10, wherein a second offset distance is provided between the second protruding portion and a top surface of at least one of the extended portions creating a second clearance between the at least one of the extended portions and the belt.

13. The conveyor system of claim 1, wherein (a) the conveyor cartridge further comprises end conveyor rollers driven by a drive conveyor roller and (b) the drive conveyor roller is a motor driven conveyor roller (MDR).

14. The conveyor system of claim 1, wherein a width of the belt extends beyond the conveyor roller width and covers at least a portion of both of the extended portions.

15. A conveyor cartridge configured to be removably coupled with a first side rail and a second side rail of a conveyor frame, the conveyor cartridge comprises:
a cartridge frame comprising:
a first side plate and an opposite second side plate that delimit a direction of the conveyor cartridge transverse to transport direction;
two extended portions, each extended portion integrally formed on a top surface of one of the first side plate or the second side plate and extending outwardly from the top surface of the corresponding one of the first side plate and the second side plate in the direction transverse to the transport direction; and
arcuate sloped surfaces integrally formed on opposite end portions of each of the extended portions, wherein the arcuate sloped surfaces are downwardly bowed on the opposite end portions to define a curved head portion and a curved tail portion for the extended portion;
conveyor rollers rotatably mounted to axles and extending a conveyor roller width between the first side plate and the second side plate, wherein an axle of at least one of the conveyor rollers protrudes out through the first side plate and the second side plate; and
a belt slidably engaged to the cartridge frame fully covering the conveyor rollers and extending beyond the conveyor rollers covering at least a portion of each of the extended portions.

16. The conveyor cartridge of claim 15, further comprising:
one or more connecting rods to mechanically couple the first side plate and the second side plate together.

17. The conveyor cartridge of claim 15, wherein the at least one of the conveyor rollers with a protruding axle is one of an idler conveyor roller or a drive conveyor roller.

18. A conveyor cartridge comprising:
a first side plate and an opposite second side plate that delimits a direction of the conveyor cartridge transverse to a transport direction;
extended portions, each extended portion integrally formed on a top surface of one of the first side plate or the second side plate and extending outward beyond a corresponding one of the first side plate or the second side plate in the direction transverse to the transport direction;
arcuate sloped surfaces integrally formed on opposing end portions of the extended portions, wherein the arcuate sloped surfaces are downwardly bowed on the opposing end portions to define a curved head portion and a curved tail portion for the extended portions; and
a belt slidably engaged to the conveyor cartridge that covers at least a portion of each of the extended portions and arcuate sloped surfaces.

19. The conveyor cartridge of claim 18, wherein (a) one or more conveyor rollers are disposed between the first side plate and the opposite second side plate and (b) the arcuate sloped surfaces each have a curved dimension substantially equal to one half of the inner radial circumference of at least one of the one or more conveyor rollers.

20. The conveyor cartridge of claim 18, wherein (a) one or more conveyor rollers are disposed between the first side plate and the opposite second side plate and (b) the arcuate sloped surfaces along with at least one of the one or more conveyor rollers imparts a gripping and a stretching force to the belt to maintain the belt at a desired tension, the belt fully covering the one or more conveyor rollers.

* * * * *